April 21, 1964     R. HALL     3,129,628
MUSIC TEACHING DEVICE

Filed June 13, 1961     4 Sheets-Sheet 1

INVENTOR.
ROY HALL
BY
Stuart R. Peterson
ATTORNEY

April 21, 1964 R. HALL 3,129,628
MUSIC TEACHING DEVICE
Filed June 13, 1961 4 Sheets-Sheet 3

INVENTOR.
ROY HALL
BY Stuart R. Peterson
ATTORNEY

_United States Patent Office_ 3,129,628
Patented Apr. 21, 1964

3,129,628
MUSIC TEACHING DEVICE
Roy Hall, 2617 W. 60th St., Minneapolis 10, Minn.
Filed June 13, 1961, Ser. No. 116,745
9 Claims. (Cl. 84—471)

This invention relates generally to devices for teaching music, and pertains more particularly to an educational device of this type for assisting the pupil to read and understand sheet music in relation to a piano keyboard.

Various charts have been devised for aiding students to orient the notes with an actual keyboard. However, these charts demand the pupil's close attention plus a considerable amount of mental effort in identifying, orienting and selecting the printed note with the proper key on the keyboard.

Instructional equipment has also been employed wherein a printed keyboard forms an integral part of the equipment. However, devices in this category have been limited as to the number of notes that can be used without making the equipment quite cumbersome. Also, at least one known contrivance has utilized a complex array of lines for associating the notes with the particular keys; this has tended to confuse the student and make the learing task more difficult than it should be.

Owing to the various shortcomings of the prior art devices known to me, need for a satisfactory device for teaching music still exists. Accordingly, the present invention has for an object the provision of a device for teaching music fundamentals to a beginning pupil with a minimum of effort on his part. Also, the invention has for an aim the provision of such a device that covers a fairly wide range of notes. A further object is to provide a device that is versatile as to its application, permitting several separate and distinct approaches, as well as to reversal of memorizing techniques. Another object is to provide a device that is extremely compact for the amount of musical information it is intended to convey. Yet another object is to provide an educational device of the foregoing character that can be inexpensively manufactured, thereby encouraging its widespread use.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Quite briefly, my device helps one to learn the natural note arrangement in a minimum amount of time. This is accomplished by isolating one treble staff note and a corresponding bass note at a time. All others are concealed. At the same time that a given treble and bass note is displayed in a viewing window, the letter designation of such note appears in a small opening spaced a considerable distance away. The student may refrain from looking in the direction of the small opening or he may cover up the opening until he has decided upon his answer, using the letter designation as a check. Concomitantly with the appearance of the letter designation, a mark of contrasting color or darkness appears in an aperture associated with the keyboard key corresponding to the displayed staff note. Here again, the student can check himself as to whether he has selected the appropriate key.

Figure 3:
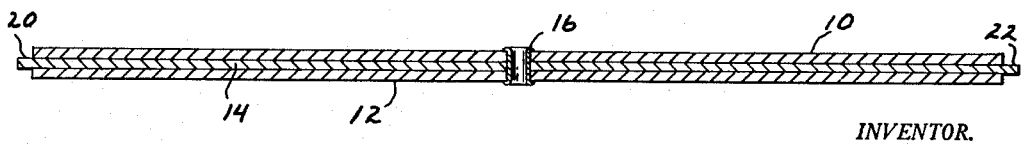
FIGURE 3 is a sectional view taken in the direction of line 3—3 of FIGURE 1.

Referring now in detail to the drawings, it can be seen from FIGURE 3 that the device is comprised of a pair of panels 10, 12 and an intermediate disc 14 rotatable about a pivot pin or rivet 16 extending through both panels and a center hole 18 in the disc 14. The panels 10, 12 and the disc 14 are preferably of heavy cardboard, although these parts may be of plastic or sheet metal, if desired. To make the device more appealing, it is recommended that the panels be configured so as to represent some well-known object or animal, the outline of a school house having been selected as a possible object in the illustrated instance. The panels 10, 12 may be held together by staples, rivets or adhesive, the latter being the simplest and herein to be considered utilized. It will be understood, though, that the points of attachment are located radially outward with respect to the disc 14 so as not to interfere with the disc's rotation. It will be observed from FIGURES 1 and 2 that segments 20 and 22 of the disc 14 extend beyond the opposite edges of the panels 10, 12, thereby facilitating the manual rotation of the disc 14.

Considering the panel 10 in more detail, it will be observed that this panel is provided with a simulated keyboard 24 composed of twelve conventional keys 26–48 covering one key less than a complete octave. These keys may be in relief, but to reduce manufacturing costs it is suggested that they be merely printed on the panel. Each of the white keys 26, 30, 34, 36, 40, 44 and 48 in this instance, is provided with an aperture for a purpose soon to be made manifest. These apertures are labeled 50–62, respectively.

The panel 10 is further provided with first, second and third windows 64, 66 and 68, the latter being of arcuate configuration. A relatively small opening 70 is employed, and for a reason soon to be made apparent this opening is spaced a considerable distance from the window 64.

The designations that appear in the window 64 will now be explained. These designations consist of twenty-eight frames 72, each containing a treble staff 74, a treble note 76, a bass staff 78, and a bass note 80. The notes 76 and 80 are the same, but spaced two octaves apart. Owing to the large number of frames 72 that can be arranged around the outer marginal region of the disc 14, approximately a six octave range may be readily covered when both the treble and bass are included.

It is an aim of the invention to provide letter identification for each of the notes 76, 80. Accordingly, letters 82 identifying these notes are angularly disposed on the disc 14 at a somewhat shorter radius. Inasmuch as the letter 82 corresponding to the particular note then in registry with the window 64 is to be displayed through the opening 70, it follows that each letter is displaced sufficiently to have this occur; thus, in the illustrated instance the letter designations will be displaced approximately 90 degrees in a clockwise direction from the particular note designations they are intended to identify.

Figure 1:
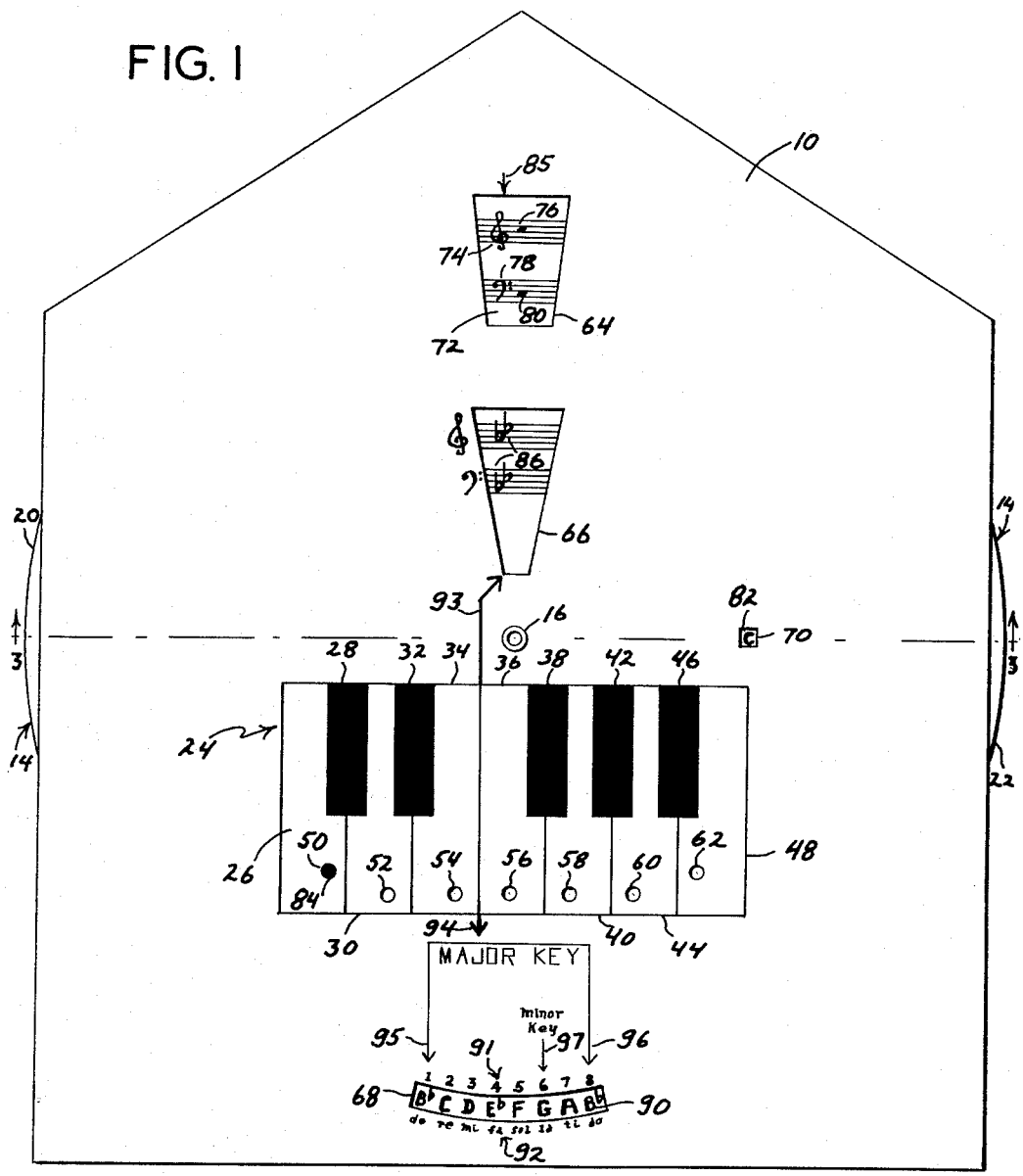
FIGURE 1 is an elevational view of the front side of my music teaching device.

One of the features of the invention is to assist the student in learning what key corresponds to what note and vice versa. For the sake of simplicity it will be assumed that only the natural notes are to be studied. Therefore, the apertures 50–62 are associated with only the white keys. With this goal in mind, it can now be pointed out that a sufficient number of discernible marks 84, for example black or some bright color, are applied to the disc 14 at angularly spaced locations, the locations and size of marks being selected so that when certain notes 76 and 80, such as those depicted in FIGURE 1, are displayed in the window 64, one mark 84 will register with the proper or corresponding key. In this case, a mark 84 blocks the aperture 50 of the key 26, for as can be learned from the opening 70, the letter 82 appearing there is the letter "C." The pupil may cover the opening with his thumb until he has had a chance to determine mentally what the notes 76, 80 are, or what the proper key is although preferably the selected notes 76, 80 are displaced within the window 64 by slightly rotating the disc 14 so that the divisional line at one side of the particular frame 72 is momentarily aligned with the arrow 85, thereby automatically shifting the letter 82 out of registry with the opening 70 so as to conceal it from view. This will also have the effect of shifting the mark 84 from the aperture 50. If desired, a mark 84 may be arbitrarily brought into registry with any key at random, the student then looking at the opening 70 to check his decision. He might also sketch the note designation appearing in window 64, later looking in this window to see whether he has applied his sketched note at the proper location on the staff he has drawn. Here again, the shifting or offsetting procedure alluded to above can be resorted to.

Another feature achievable with panel 10 and the disc 14 is the studying of fifteen key signatures movable into the window 66, these key signatures being denoted by the reference numerals 86 and being approximately at an intermediate radius. These key designations are arranged so as to be successively movable into registry with the window 66.

To aid the student in memorizing the notes of the various scales, use of the window 68 is made. Thus, groups 90 of letters are peripherally disposed about the circumference of the disc 14, and each is oriented at a 180 degree spacing from the particular signature designation 86 it is to relate to. Since there are eight notes constituting a complete octave, numerical indicia 91 is located so that the note sequence may be observed. Likewise, the student is further helped by having the "do," "re," "mi," "fa," "sol," "la," "ti," "do" representations applied, these being indicated by the reference numeral 92.

More specifically, as pictured, the key signature of B flat appears in the window 66. Hence, the scale notes B flat, C, D, E flat, F, G, A and B flat are displayed in the arcuate window 68, these note designations bearing the collective reference numeral 90 that has been mentioned in the preceding paragraph. It will also be of educational assistance to the student to have the major key of the signature appearing in the window 66 identified in the window 68. Therefore, a system of arrows labeled 93, 94, 95 and 96 provides an easy guide means. Likewise, it may be of help to have the minor key identified, and with this in mind the arrow 97 has been provided.

Figure 2:
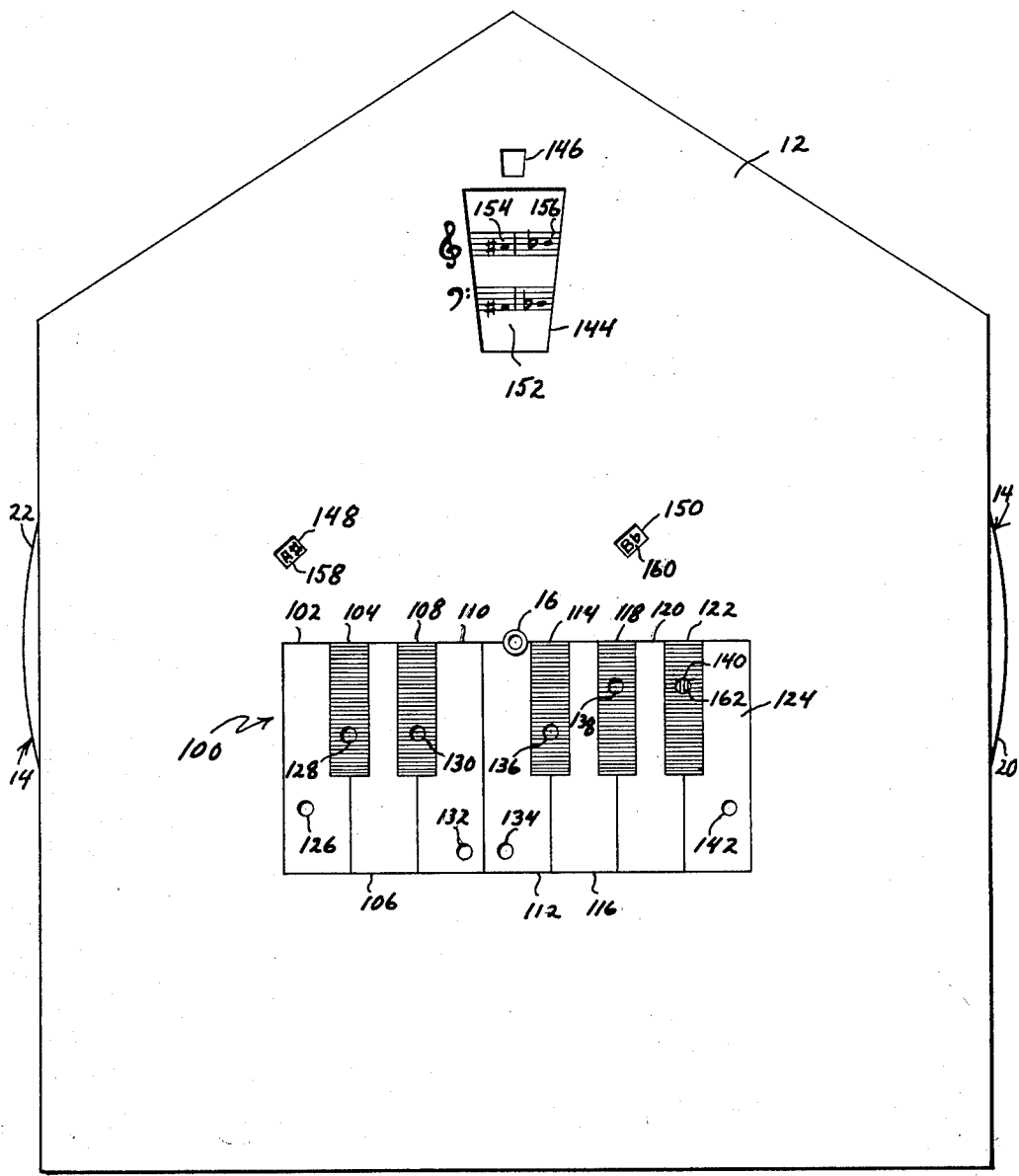
FIGURE 2 is a view similar to FIGURE 1 but showing the rear side of the device.
Figure 4:
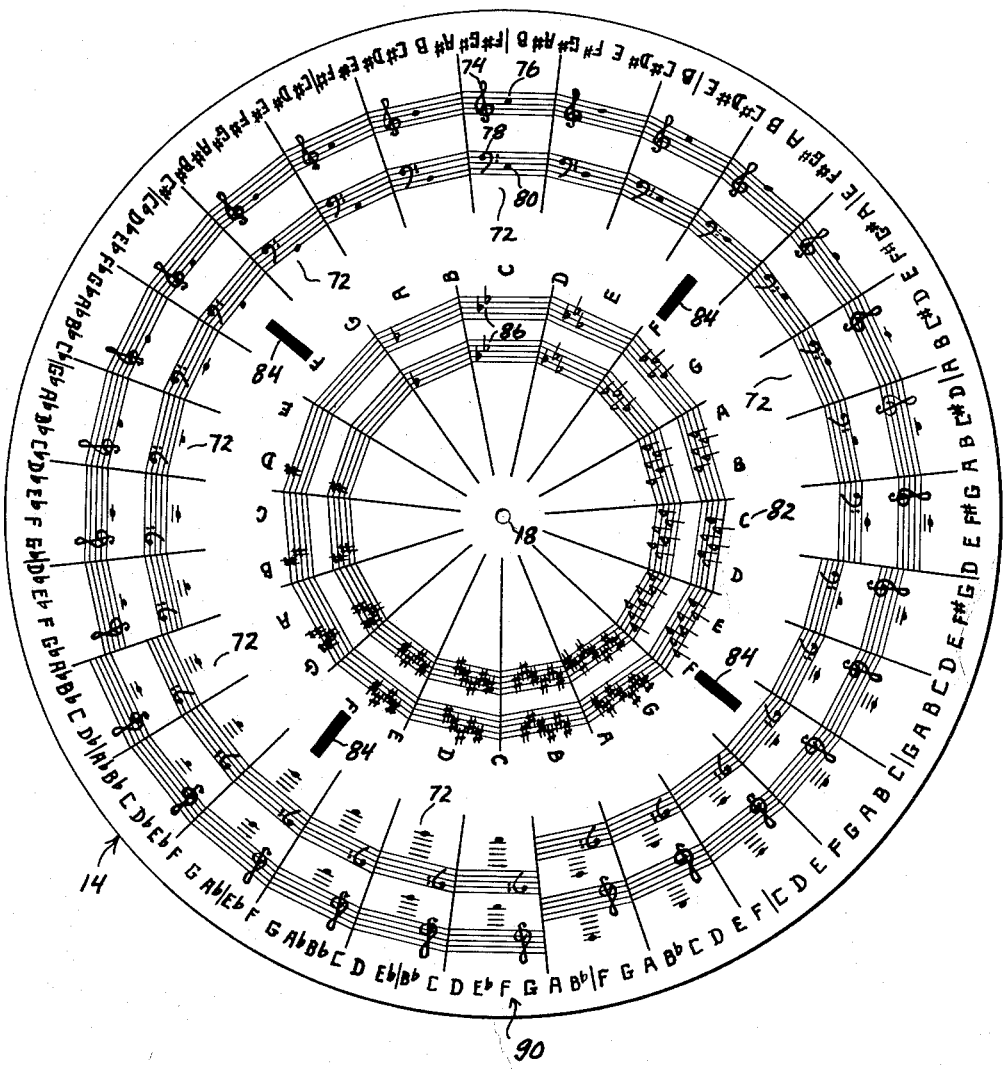
FIGURE 4 is a face view of one side of the interleaved rotatable disc.

Turning now to the other side of my device, this side appearing in FIGURE 2, it should be explained at the outset that the panel 12 is intended primarily for study of sharps and flats, although naturals are shown wherever the particular sharp or flat has a complementary natural name. As with the panel 10, the panel 12 is provided with a simulated keyboard, this keyboard being denoted by the reference numeral 100. Like the keyboard 24, the present keyboard includes a plurality of keys 102–124. Unlike the earlier-described keyboard 24, though, different keys have apertures. More precisely, the key 102 has an aperture 126, the key 104 an aperture 128, the key 108 an aperture 130, the key 110 an aperture 132, the key 112 an aperture 134, the key 118 an aperture 138, the key 122 an aperture 140, and the key 124 an aperture 142. Because of the apertures 128, 130, 136, 138 and 140 the black keys 104, 108, 114, 118 and 122 have been hatched rather than depicted in solid black form as were the keys 28, 32, 38, 42 and 46 of FIGURE 1.

A single viewing window 144 is formed in this panel 12, and has centrally adjacent thereto a relatively small opening 146 for a purpose that will be explained later. Additional small openings 148, 150 are located in a spaced relation with the window 144.

The designations on the disc 14 that appear in the window 144 will now be described. These designations consist of twenty-seven split frames 152, each having the note 154 and 156 that are distinguishable from the other by virtue of one being denoted by a sharp and the other by a flat. For instance, A sharp and B flat are the same note, but are simply indicated differently so as to acquaint the pupil with the different designation that will be formed when reading sheet music. Of course, in some cases the sharp or flat designation will result in a natural designation, and on these occasions the note 154 or 156 will be so indicated.

As with the panel 10, a desideratum of the side now under discussion is to apprise the student of the letter identification. Therefore, the letter designations 158 identify the lefthand notes 154 of the various split frames 152, and by the same token the letter designations 160 denote what the righthand notes 156 are. Inasmuch as the note 154 appearing at the left in the window 144 is an A sharp, this letter designation will be displayed in the opening 148. Similarly, the note 156 at the right in the window is a B flat, so it is simultaneously shown in the opening 150. The various letter designations 158, 160 are angularly oriented so as to have a correct spatial relationship with the notes 154, 156, respectively.

Figure 5:
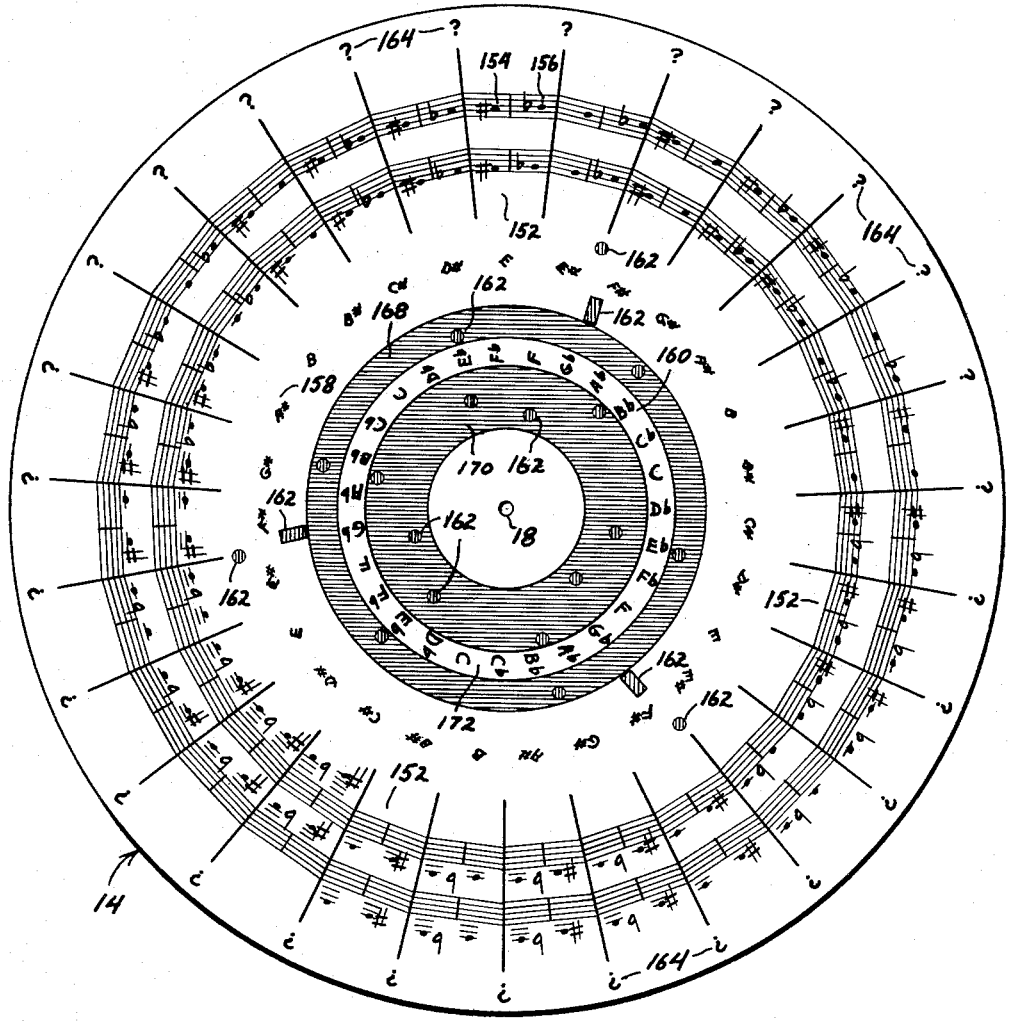
FIGURE 5 is a view of the other side of the disc.

To teach what key 102–124 corresponds to the displayed notes 154, 156, various angularly disposed marks labeled 162 are placed on the side of the disc 14 appearing in FIGURE 5. All that is necessary is that these marks be optically discernible from the particular keys which they are to indicate as proper. Thus, those related to the five black keys 104, 108, 114, 118 and 122 might be white, and those concerned with the seven white keys might be black. More simply, though, these marks 162 might all be red or some other easily detectable color. In the illustrated instance, the marks 162 have been distinguished by hatch lines extending at right angles to the background hatching hereinafter referred to which is to align itself with that employed for the black keys 104, 108, 114, 118 and 122 of FIGURE 2. In any event, close examination of the key 122 in FIGURE 2 will reveal that one of the marks 162 has been brought into juxtaposition with the aperture 140 to show that this is the key for the notes 154, 156 currently visible in the window 144.

The purpose of the opening 146 will now be explained. From FIGURE 5, it can be seen that a series of question marks 164 are distributed at angularly spaced intervals adjacent the periphery of the disc 14. These question marks 164, it will be perceived, are situated so as to be in radial alignment with the division lines for the split frames 152. These question marks 164 are at the proper radial distance so as to appear in the opening 146 when deliberately moved there for the purpose of shifting the letter designations 158, 160 out of viewing registry with the windows 148, 150, respectively. Also, none of the marks 162 will be visible in any of the apertures 126–142 at this time. This affords the student the opportunity of guessing the identity of the note 156 or 154 then appearing in the window 144. Although not illustrated, the leader can appreciate that one of the notes 156 will now be located at the left in the window 144 and the note 154 of the next adjacent split frame will be to the right. After making his determination, the student can shift the disc 14 so that the selected note is moved to the left or right, as the case may be, to present a truly centered split frame 152. This causes the proper letter designation to appear in the window 148 or 150, the particular window depending on whether a sharp or flat designation has been selected. Simultaneously, the corresponding proper key will be denoted through one of the apertures 126–142, and the question mark will at the same time disappear.

Two darkened regions 168 and 170, separated by an undarkened annular ring 172 produce a non-distinguishing condition with respect to the black keys 104, 108, 114, 118 and 122 except when a key-identifying mark 162 is intended to be brought into view.

The manner of using my music teaching device has been presented in conjunction with the preceding description, thereby rendering it unnecessary to append a separate operational sequence to what has already been mentioned. The practical value of my device for instruction purposes should therefore be readily apparent.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A music teaching device comprising a panel provided with a simulated, rectangular, piano keyboard on one side thereof including a plurality of keys and having apertures located in at least some of the keys of said keyboard, said panel also having a window spaced from said keyboard and an opening spaced from said window, and a rotatable disc confronting the other side of said panel having a plurality of staff and note designations at angularly disposed intervals so as to be selectively movable into registry with said window, said disc also having letter designations at angularly disposed intervals for identifying said note designations and movable into registry with said opening in correspondence with the particular note designation then appearing in said window, and said disc also having thereon discernible marks at spaced angular intervals located so that a mark will appear in the aperture located in the proper key for the particular note then appearing in said window to thereby indicate the key corresponding to said displayed note, said keyboard possessing the ability to operate as described with said plurality of keys consisting of seven white keys and five black keys, said keyboard being located between the axis of rotation of said disc and one edge of said panel and extending substantially an equal distance toward each side edge of said panel.

2. A music teaching device in accordance with claim 1 in which a segment of said disc extends beyond one edge of said panel to facilitate manual rotation of said disc.

3. A music teaching device in accordance with claim 1 in which said panel is provided with second and third spaced windows, said disc having various key signature designations thereon arranged in an orderly and uninterrupted sequence at angularly disposed intervals so as to be selectively movable into registry with said second window and having letter designations at angularly disposed locations for indicating the scale corresponding to the key signature designation then appearing in said second window, said scale designations being located so as to appear in said third window in correspondence with the key signature designation then being displayed in said second window.

4. A music teaching device in accordance with claim 1 in which sharp, flat and complementary natural designations are provided on said disc for each note, with said sharp, flat or complementary natural designations for a given note simultaneously appearing in said first window, there further being a second opening on said panel and a second group of letter designations at angularly spaced intervals on said disc to provide means for identifying the additional note displayed in said first window and at the same time furnishing the alternate name of the related key on said keyboard.

5. A music teaching device in accordance with claim 4 in which said panel is provided with a third opening, said disc having thereon a series of angularly spaced marks registrable with said third opening to indicate that unrelated notes are positioned in said first window without revealing said unrelated notes by name or keyboard location until related notes have been properly positioned in said first window.

6. A music teaching device in accordance with claim 5 in which said third opening is centrally disposed adjacent said first window.

7. A music teaching device comprising first and second panels each having a simulated keyboard thereon and having apertures associated with at least some of the keys of said keyboard, each panel also being provided with a window, the first panel having an opening and the second panel having a pair of such openings, and a disc rotatable between said panels provided with a plurality of staff and note designations on each side thereof for display through said respective windows, the note designations on the side of the disc confronting said first panel being individual notes, and the note designations on the side of said disc confronting said second panel being paired as to sharps, flats and complementary naturals constituting particular notes, the first-mentioned disc side having letter designations at angularly disposed intervals for identifying the note designations on its said side and movable into registry with the opening of said first panel in correspondence with the particular note designation then appearing in the window of said first panel and the second-mentioned disc side having respective letter designations at angularly disposed intervals for identifying the sharp, flat or complementary natural note designations on its said side and movable into registry with the openings of said second panel in correspondence with the particular sharp and flat note designations then appearing in the window of said second panel, and said disc also having on each side thereof discernible marks at spaced angular intervals located so that a mark will appear in the aperture of each panel associated with the proper keys for the notes then appearing in said windows to thereby indicate the keys corresponding to said displayed notes.

8. A music teaching device in accordance with claim 7 in which one of said panels is provided with second and third spaced windows, the side of said disc confronting the said one panel having various key signature designations thereon at angularly disposed intervals so as to be selectively movable into registry with said second window and having letter designations at angularly disposed locations for indicating the scale corresponding to the key signature appearing in said second window, said scale designations being located so as to appear in said third window in correspondence with the key signature designation then being displayed in said second window.

9. A music teaching device in accordance with claim 1 in which said panel is provided with a staff-positioning mark offset toward one side of said window to permit the study of any staff note without revealing its letter identification in said opening or its keyboard designation.

References Cited in the file of this patent

UNITED STATES PATENTS

| 954,436 | Hunter | Apr. 12, 1910 |
| 2,542,235 | Clopton | Feb. 20, 1951 |

FOREIGN PATENTS

| 136,874 | Great Britain | Dec. 17, 1919 |
| 539,044 | Germany | Nov. 23, 1931 |